US012788027B2

(12) United States Patent
Golan et al.

(10) Patent No.: US 12,788,027 B2
(45) Date of Patent: Nov. 10, 2026

(54) MECHANISM FOR FORMING AN OPENING IN AN INGREDIENTS' CONTAINER

(71) Applicant: SOLO GELATO LTD., Hila (IL)

(72) Inventors: Eyal Golan, Nirit (IL); Iliya Slavkin, Tel Aviv (IL); Gal Halevi, Kiryat Ono (IL)

(73) Assignee: SOLO GELATO LTD., Hila (IL)

( * ) Notice: Subject to any disclaimer, the term of this patent is extended or adjusted under 35 U.S.C. 154(b) by 0 days.

(21) Appl. No.: 19/132,118

(22) PCT Filed: Nov. 20, 2023

(86) PCT No.: PCT/IL2023/051195

§ 371 (c)(1),
(2) Date: May 22, 2025

(87) PCT Pub. No.: WO2024/116170

PCT Pub. Date: Jun. 6, 2024

(65) Prior Publication Data

US 2026/0000093 A1 Jan. 1, 2026

Related U.S. Application Data

(60) Provisional application No. 63/429,283, filed on Dec. 1, 2022.

(51) Int. Cl.

| | |
|---|---|
| *A23G 9/08* | (2006.01) |
| *A23G 9/12* | (2006.01) |
| *A23G 9/22* | (2006.01) |
| *A23G 9/28* | (2006.01) |

(52) U.S. Cl.
CPC ................ *A23G 9/28* (2013.01); *A23G 9/08* (2013.01); *A23G 9/12* (2013.01); *A23G 9/22* (2013.01); *A23G 9/281* (2013.01)

(58) Field of Classification Search
CPC ... A23G 9/28; A23G 9/12; A23G 9/22; A23G 9/281; A23G 9/08
See application file for complete search history.

(56) References Cited

U.S. PATENT DOCUMENTS

| | | | | |
|---|---|---|---|---|
| 9,968,113 B2 * | 5/2018 | Lazzarini | ................. | A23G 9/28 |
| 10,595,544 B2 * | 3/2020 | Beth Halachmi | ...... | A23G 9/045 |
| 10,653,164 B2 * | 5/2020 | Cocchi | ................... | A23G 9/283 |
| 11,528,922 B2 * | 12/2022 | Beth Halachmi | ........ | A23G 9/28 |
| 2016/0198735 A1 * | 7/2016 | Beth Halachmi | ...... | A23G 9/282 |
| 2016/0302443 A1 * | 10/2016 | Lazzarini | ................ | A23G 9/22 |
| 2016/0353767 A1 * | 12/2016 | Cocchi | .................. | B65D 85/78 |

(Continued)

FOREIGN PATENT DOCUMENTS

| | | |
|---|---|---|
| EP | 2508080 A1 | 10/2012 |
| EP | 3081093 A1 | 10/2016 |
| EP | 3100615 A1 | 12/2016 |

(Continued)

*Primary Examiner* — Frederick C Nicolas
(74) *Attorney, Agent, or Firm* — Vorys, Sater, Seymour and Pease, LLP; Maryellen Feehery Hank

(57) ABSTRACT

An opening mechanism in a food preparation appliance forms an opening in an ingredients' container. More specifically, the opening mechanism in a food preparation appliance enables the opening of an edible ingredients' container which is fed into the appliance for preparation of an edible product from the ingredients.

13 Claims, 10 Drawing Sheets

(56) References Cited

U.S. PATENT DOCUMENTS

2020/0146311 A1 * 5/2020 Beth Halachmi ...... A23G 9/228

FOREIGN PATENT DOCUMENTS

| | | | |
|---|---|---|---|
| IT | 202100004829 | A1 | 9/2022 |
| WO | 20130121421 | A1 | 8/2013 |
| WO | 2015022678 | A1 | 2/2015 |
| WO | 2020039439 | A1 | 2/2020 |
| WO | 2020053859 | A1 | 3/2020 |

* cited by examiner

MECHANISM FOR FORMING AN OPENING IN AN INGREDIENTS' CONTAINER

TECHNOLOGICAL FIELD

The present disclosure concerns a mechanism for forming an opening in an ingredients' container. More specifically, the disclosure concerns a mechanism in a food preparation appliance that enables opening of an edible ingredients' container fed into the appliance for preparation of an edible product from the ingredients.

BACKGROUND

Single-use containers that hold ingredients for preparing edible products in appliances making use of such containers is known. Typically, the container is inserted into a receiving module of the appliance, in which the container is pierced or its seal removed or ruptured, to permit access into the container or permit release of the ingredients from the container and their feeding into a processing unit of the appliance.

When the ingredients are in liquid form, the container is typically fed into the appliance inverted (i.e. lid down) or in an angle, to permit flow of the liquid ingredients out of the container, once the seal is broken. However, such angled feeding causes uneven tension applied onto the lid by the ingredients contained within the container, often resulting in difficulties to rupture the seal or maintain even flow of the ingredients out of the container after its rupturing.

GENERAL DESCRIPTION

The present disclosure provides an ingredients' container receiving module and an edible product preparation appliance comprising it, that enables receiving ingredients' containers of various volumes, and has a mechanism that enables formation of two or more openings in the lid of the container in a manner that is not impacted by the tension applied on the lid by the ingredients and allow substantially even flow of ingredients out of the container after its opening.

In one of its aspects, the present disclosure provides an appliance for preparation of edible product from edible ingredients, the appliance comprising an ingredients' container receiving module that is configured to removably receive an ingredients' container, the container having a container body and a sealing film cover, and the module is configured to form two or more openings in said sealing film cover; a processing chamber in liquid communication with the module, the processing chamber being configured for receiving ingredients from an ingredients' container received in said cavity through at least one of said openings, and process the ingredients into said edible product; and a dispensing nozzle in liquid communication with the processing chamber and configured to dispense the edible product.

The ingredients' container receiving module, which is also an aspect of this disclosure, comprises a cavity dimensioned to removably receive said ingredients' container; an rotatable element having at least one cutting edge, the rotatable element being fixed about a rotation axis to a wall section of said cavity at a first distance from said wall section, and configured to rotate generally parallel to said wall section, the cavity being configured to stationarily receive the ingredients' container, such that said sealing film cover is positioned to face said rotatable element; and said wall section being configured with two or more protruding wall segments, spaced apart along a rotation path of the rotatable element and configured to be engaged by the rotatable element and displace the rotatable element during its rotation along the rotation path to a second distance from said wall section when the rotatable element is in contact with said protruding wall segments, the second distance being larger than the first distance, to cause the cutting edge to protrude through said film when the rotatable element is in said second distance, thereby forming said two or more openings in the sealing film cover.

In other words, the ingredients' container receiving module is typically configured to receive an ingredients' container and form two or more openings in its sealing film cover by means of a rotatable element. The container is received within a cavity of the module, that also houses the rotatable element, and is configured to stationarily hold the container with its sealing film cover facing the rotatable element. During its rotation, a cutting edge of the rotatable element is made to selectively come into contact with the sealing film cover, thereby forming two or more openings at defined locations in the sealing film cover, to permit the liquid content thereof to be flow out of the container into a processing chamber of the appliance for processing the ingredients into an edible product.

In the module, the rotatable element is rotatable about a rotation axis, generally parallel to the plane of the wall of the cavity to which it is attached. Two or more protruding wall segments are formed onto the wall, and project outward from the wall. The protruding wall segments are arranged in a spaced apart manner along the rotation path of the rotatable element, such that the rotatable element engages these protruding wall segments during its rotation, thereby changing the distance between the rotatable element and the wall section during this engagement. Namely, the rotatable element rotates at a first distance from the surface of the wall section, and due to the engagement with the protruding wall segments, the distance between the rotatable element and the wall section increases to a second distance, thereby proximating the cutting edge of the rotatable element to the sealing film cover during the movement of the rotatable element along the protruding wall segments to make the cutting edge to penetrate the sealing film cover and form the openings. The location of the openings corresponds to the location of the protruding wall segments.

By modifying the location, number and height of the protruding wall segments, selective cutting of the sealing film cover can be obtained, at different locations and in different geometries. For example, when containers of various sizes and geometries are used, an array of protruding wall segments can be defined with different heights, such as to ensure that at least two of such protruding wall segments displace the rotatable element to ensure contacting of the cutting edge with the sealing film cover. Further, by appropriately selecting the height of the protruding wall segments, the cutting edge can be stably maintained at said second distance throughout its movement therealong during its rotation, resulting in stable cutting movement regardless of the variable tension of the sealing film cover, which is typically uneven. Such an arrangement ensures robust and repeatable cutting, regardless of the opposite pressure applied by the liquid ingredients within the container onto the sealing film cover.

As noted, the module is arranged to form two or more openings in the sealing film cover during the rotational movement of the rotatable element. At least one of these openings permits flow of the ingredients out of the container, while another one of these openings functions to enable introduction of ambient air into the container to permit an even and steady flow of ingredients out of the container. By controlling the location of the protruding wall segments, control can be obtained over the relative position of the openings, permitting optimization of the flow rate of ingredients out of the container.

According to some embodiments, the rotatable element is biased to maintain said first distance when the rotatable element does not engage protruding wall segments. By one example, the rotatable element is flexible, and hence the flexibility of the rotatable element biases it to maintain said first distance, as well as maintain the rotatable element in contact against the protruding wall segments during the rotatable element's engagement with the protruding wall segments. By another example, such bias can be obtained by a biasing element (e.g. a spring), associated with the arm.

According to some embodiments, the rotatable element can comprise a single cutting edge. The cutting edge can be formed at a distal end or a distal portion of the rotatable element (i.e. at an extreme end from the rotation axis). Alternatively, the cutting edge can be formed between a distal end of the rotatable element and the rotation axis. By other embodiments, the rotatable element comprises two or more cutting edges.

By some embodiments the rotatable element is rotatable arm and the cutting edge is disposed at a distal end or a distal end portion of the arm. According to other embodiments, the rotatable arm has a plurality of cutting edges, spaced apart along the length of the arm.

By some other embodiments, the rotating element comprise two or more arm segments, extending radially from the rotation axis, each of the arm segments comprising at least one cutting edge. The arm segments can have the same length or a different length, and can bear the same number of cutting edges or a different number of cutting edges.

By some embodiments, the rotatable element is made of an elastic metal or metal alloy.

According to some embodiments, the ingredients' container receiving module comprises a container seat, that is configured to receive at least a bottom portion of the container body. The container seat is typically displaceable, to permit positioning of the container within the cavity such that the sealing film cover is positioned to face the rotatable element, also assisting in ensuring alignment between the sealing film cover and the rotatable element.

While the module described herein can be incorporated into a variety of food preparation appliances which operate on the basis of introduction and rupturing of an ingredients' container, the module is particularly useful for appliances for preparation of a cooled edible product from said edible ingredients, such as ice cream, gelato, soft serve ice cream, smoothies, slushies, sorbets, granita, cold drinks, frozen yogurt, etc. In the preparation of such products, the ingredients contained in the container are typically liquids having a relatively high viscosity (such as syrups, cream, dispersions of powders in liquid, gels, emulsions, etc.). According to some embodiments, the processing chamber of the appliance is a cooled processing chamber, and comprising one or more rotatable mixing pedals.

According to some embodiments, the cavity is dimensioned to receive an ingredients' container that is configured to hold edible ingredients for the preparation of a single serving of edible product from the entire content of said ingredients' container. Typically, the cavity is configured to receive an ingredients' container in the form of a single serving pod or a single serving capsule. Such pods or capsules have a typical volume of between about 50 ml and about 1000 ml, and are designed such that the entire content of the container is used for the manufacture of a single serving of the edible product.

According to other embodiments, the cavity is dimensioned to receive an ingredients' container that is configured to hold edible ingredients for the preparation of several servings of the edible product.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which.

DETAILED DESCRIPTION OF EMBODIMENTS

Figure 1:
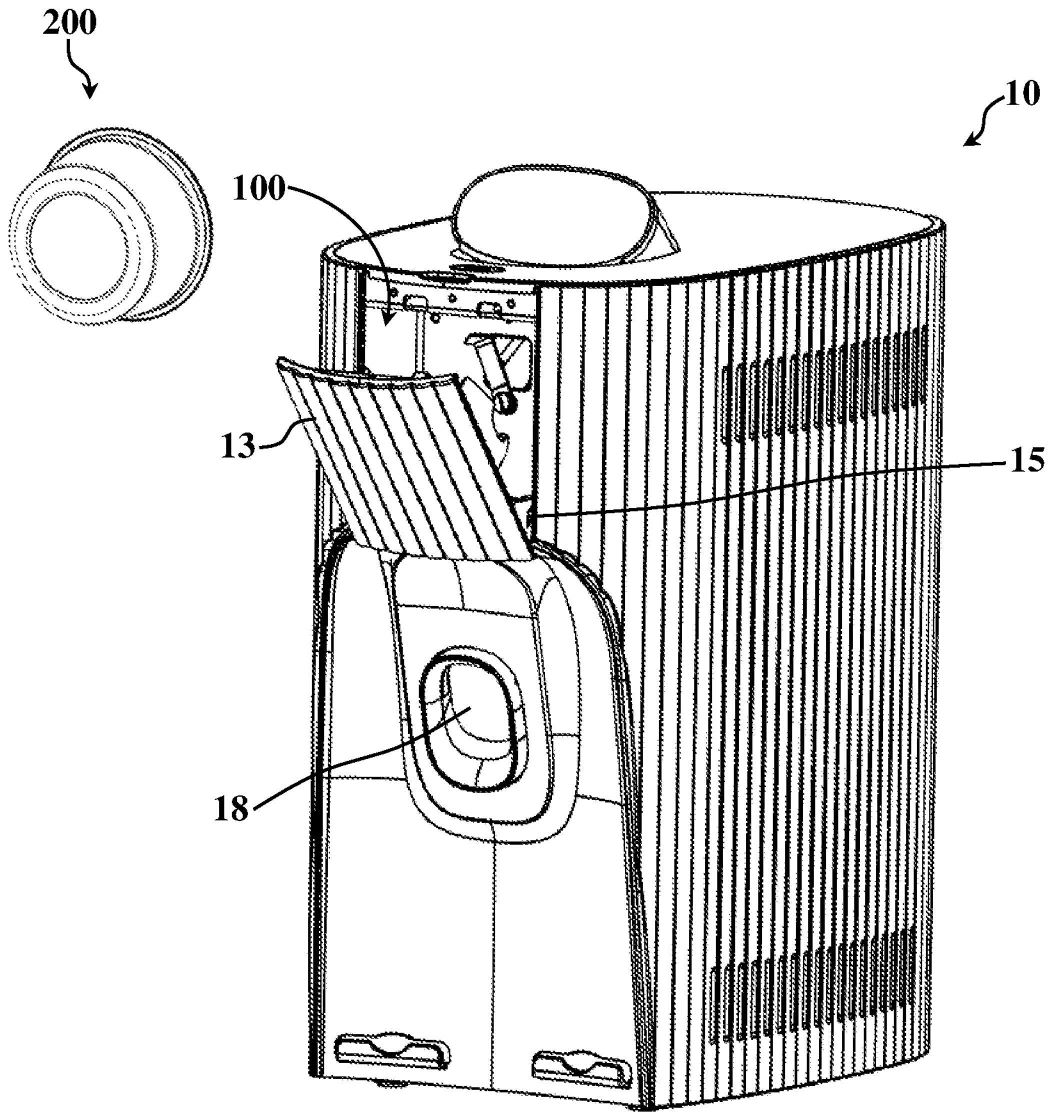
FIG. 1 shows an appliance for preparation of edible product from edible ingredients according to an embodiment of this disclosure.
Figure 2:
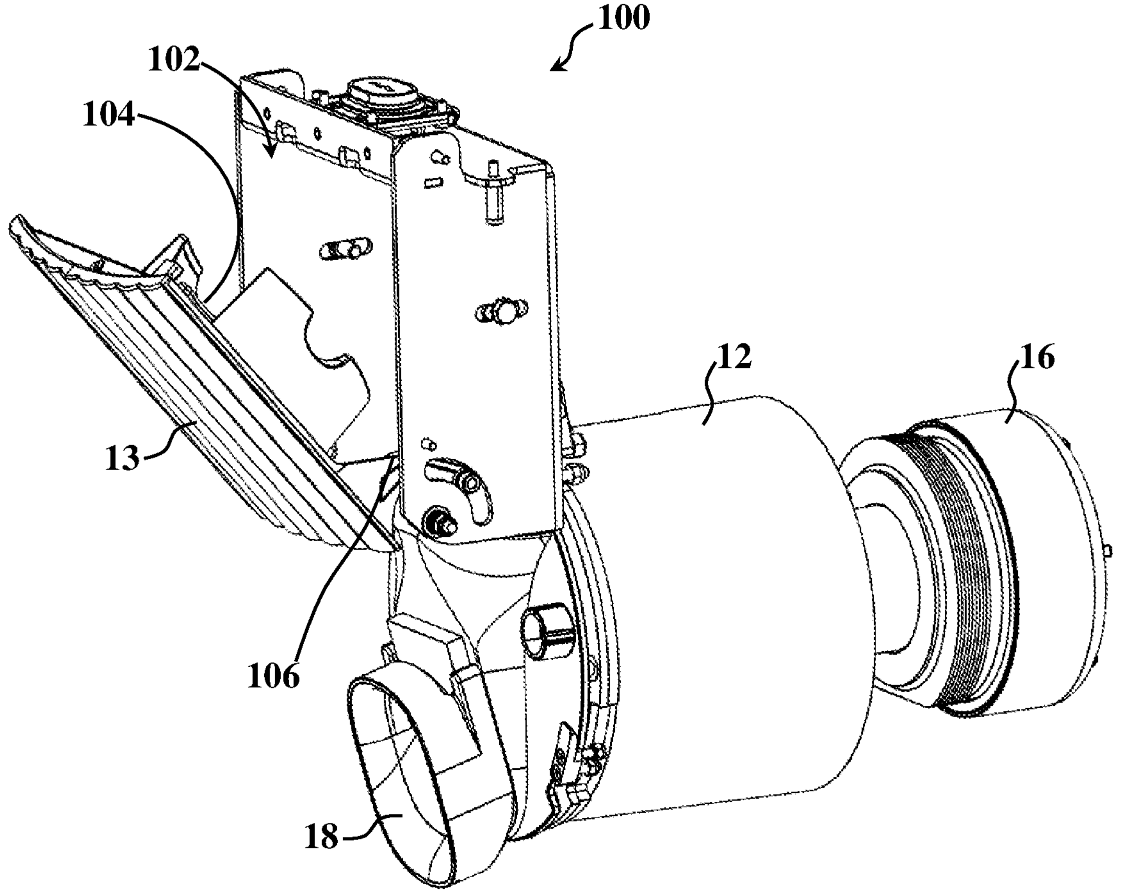
FIG. 2 shows the ingredients' processing chamber in isolation, with a capsule feeding unit that includes a module for forming an opening in the capsule associated therewith, according to an embodiment of this disclosure.
Figure 3A:
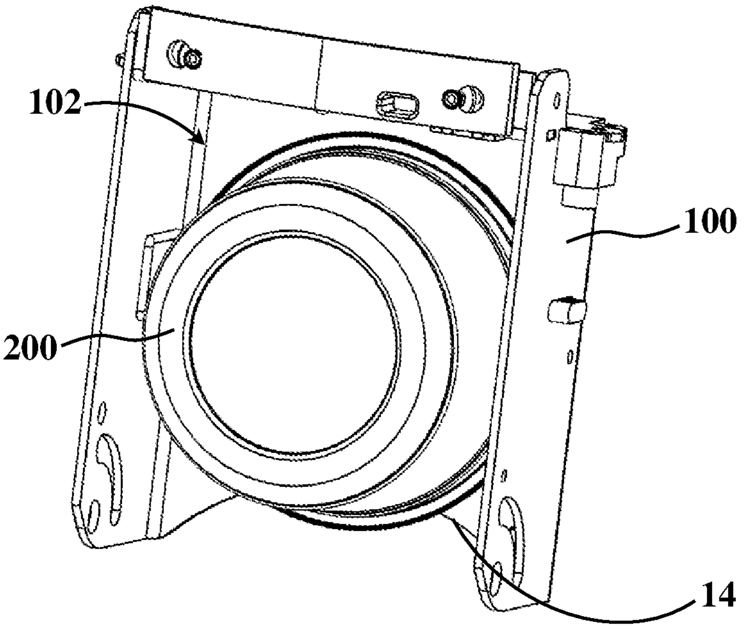
FIGS. 3A-3B show the module for forming an opening in the capsule of FIG. 2 in isolation with the associated capsule.
Figure 3B:
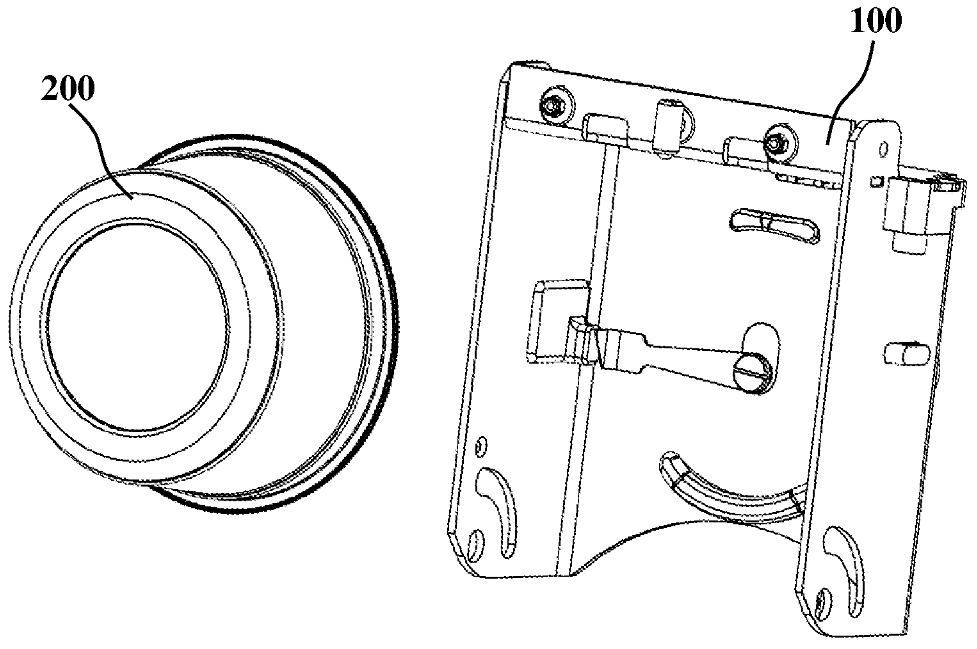
Figure 4A:
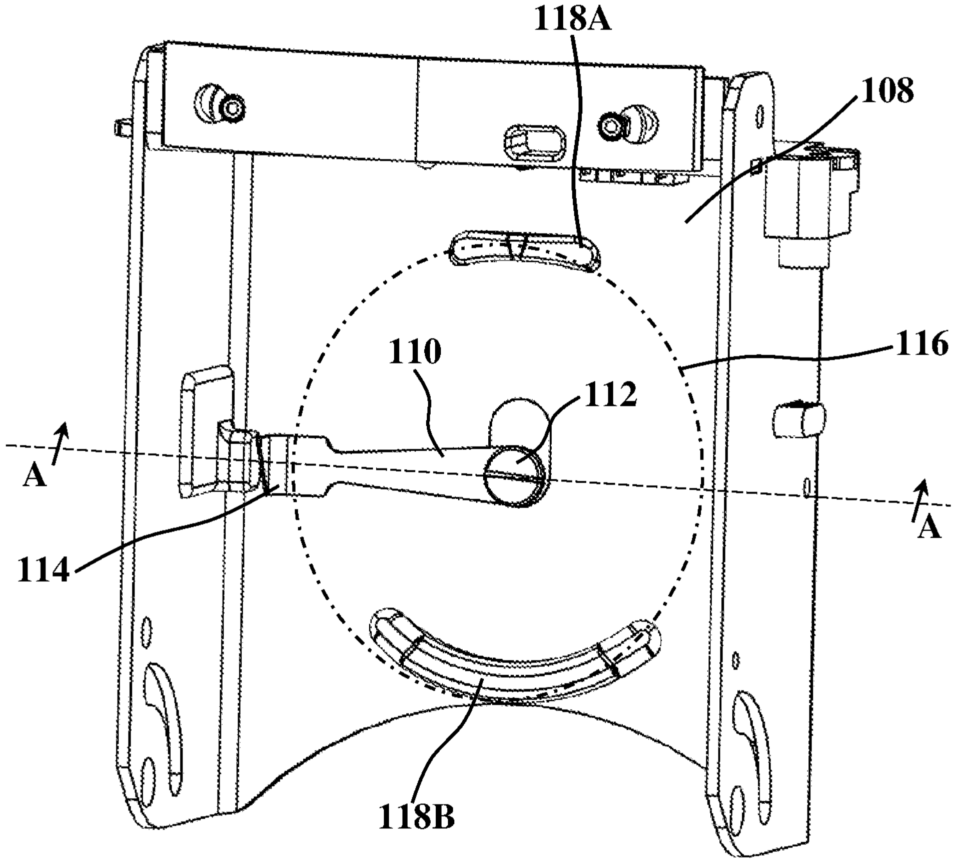
FIGS. 4A-4C show the nodule of FIGS. 3A-3B in three operational positions: a rest position (FIG. 4A), a first position for forming a vent opening in the capsule (FIG. 4B), and a second position for forming an ingredients' extraction opening in the capsule (FIG. 4C)
Figure 4B:
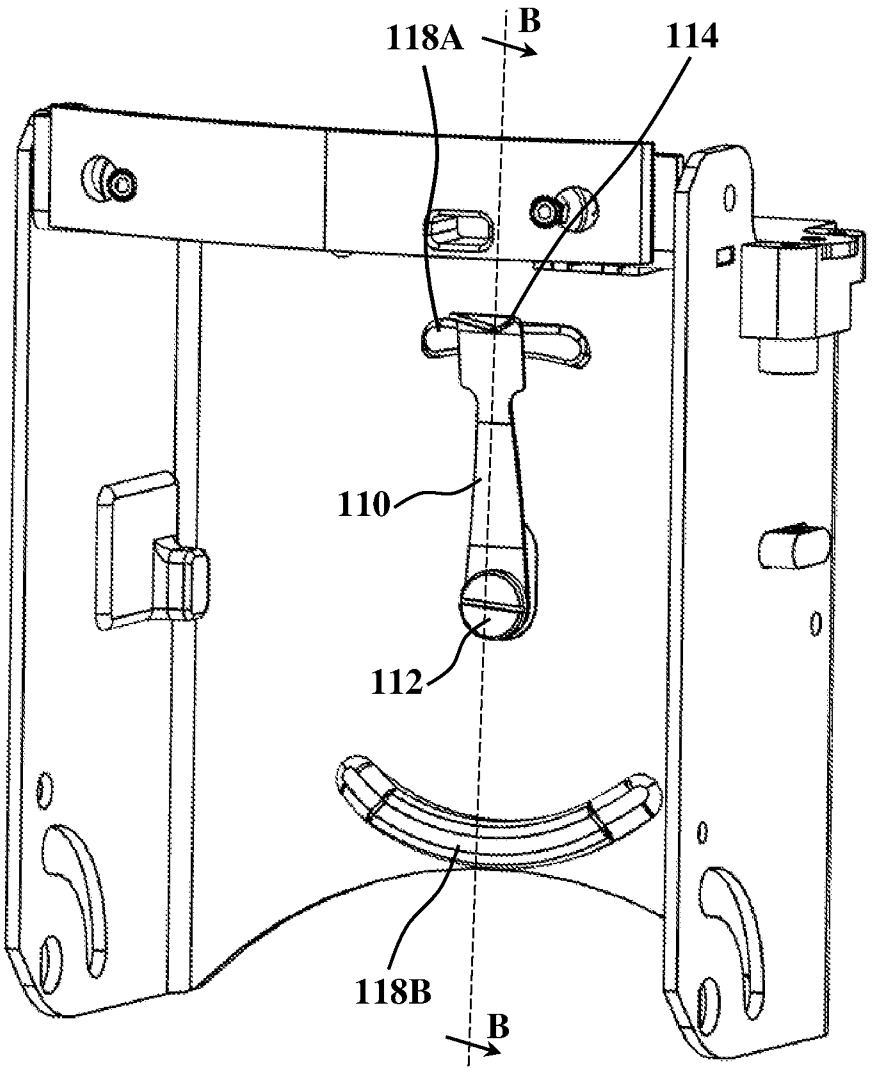
Figure 4C:
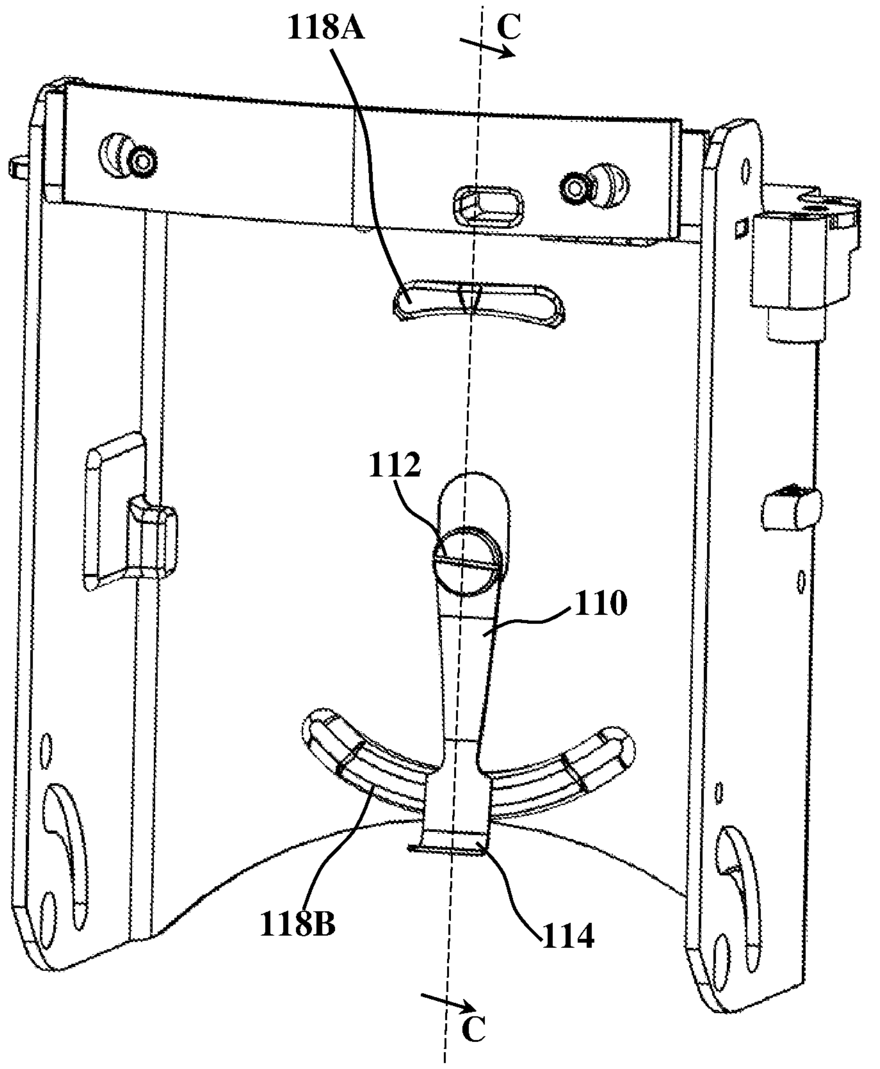

Turning first to FIG. 1, shown is an appliance 10 that is configured to receive an ingredients' container, such as capsule 200 within receiving module 100 formed within appliance 10. A specific example of such an appliance is a cooled edible product appliance. The appliance 10 typically comprises a processing chamber 12 (FIG. 2) that is in liquid communication with module 100 via inlet 14 (better seen in FIG. 3A). The ingredients are introduced into the processing chamber 12 from the capsule 200 received in module 100, as will be described, via inlet 14, and processed in the processing chamber into an edible product. Processing chamber 12 typically comprises a dasher or one or more rotating blades (not shown), rotatable by motor 16 for mixing air and/or supplemental ingredients into the ingredients received from the capsule, in order to obtain the final edible product, that is the dispensed from the processing chamber 12 via a dispensing nozzle 18. A specific example of such an appliance is a counter-top appliance for the preparation of cooled edible products, such as those described, for example, in PCT patent applications publication nos. WO2013/121421, WO2015/022678, WO2020/053859 and WO2020/039439 (the relevant content of which is incorporated. herein by reference).

In FIGS. 3A-5C, module 100 is seen in isolation. Module 100 is configured to removably receive an ingredients' container, for example a capsule of the kind shown in isolation FIG. 6A. Container (e.g. capsule) 200 has a container body 202 and a sealing film cover 204, and hold therein ingredients for the preparation of the edible product by the appliance. Typically, container 200 is designed to hold edible ingredients for the preparation of a single serving of edible product from the entire content of the container; for example, the container can be in the form of a single serving pod or a single serving capsule, e.g. having a typical volume of between about 50 ml and 500 ml, and designed such that the entire content of the container is used for the manufacture of a single serving of the edible product by the appliance.

At least the sealing film cover 204 is made of a pierceable or cuttable material, such as aluminum foil or plastic film, to permit its cutting by the opening mechanism residing in module 100, as will now be described.

Module 100 comprises a cavity 102 dimensioned to removably receive the container 200. In this example, container 200 is received within container seat 104 that is formed in the internal side of displaceable cover portion 13. The displaceable cover portion 13 is, for example, pivotal about pivot axis 15, between an open position (seen in FIG. 1A) in which it can receive a capsule 200 within the seat 104, and a closed position (not shown) in which the cover portion 13 is substantially flush with the external surface of the appliance. Displacing the cover portion 13 into the closed position brings the container 200 into proximity with rotatable element 110 of the module 100 (to be described below).

Seat 104 has a shaped cut-out 106, which is configured to hold the container within the cavity below the container's rim 206. As noted, the cover portion 13 is displaceable, thereby displacing seat 104 that is associated therewith, to move the container, once received in the seat, into a position such that the container's cover 204 faces rotatable element 110 that affixed to wall section 108 at rotation axis 112. In this specific example, rotatable element 110 is in the form of an arm, extending radially from the rotation axis 112, and having a cutting edge 114 at a distal end portion thereof. Rotatable element 110 rotates along a rotation path, schematically represented as 116, generally parallel to the face of wall section 108, at a first distance d from said face.

Figure 5A:
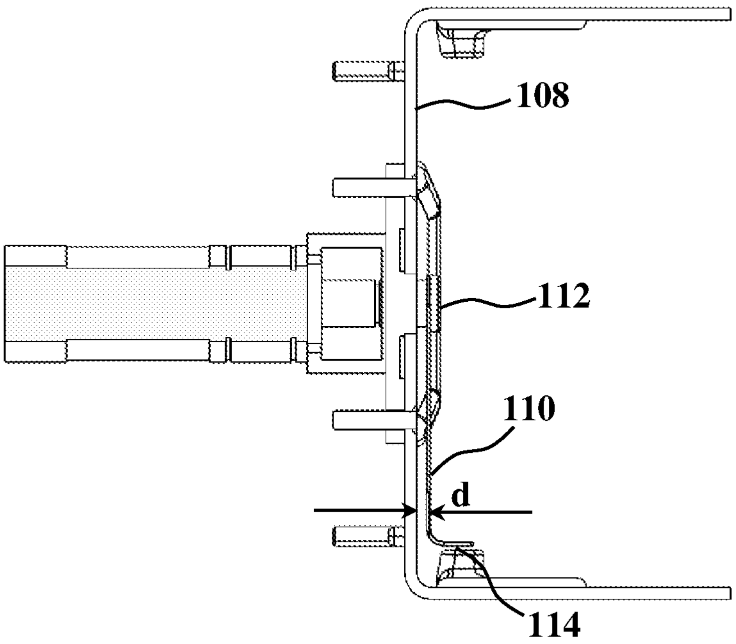
FIGS. 5A-5C are cross sectional views along lines A-A (FIG. 5A), B-B (FIG. 5B) and C-C (FIG. 5C), corresponding to the positions of FIGS. 4A-4C.
Figure 5B:
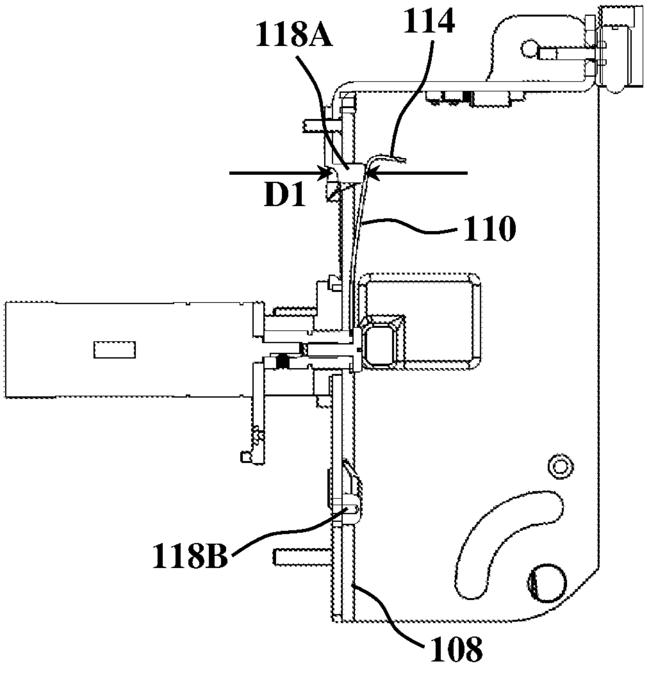
Figure 5C:
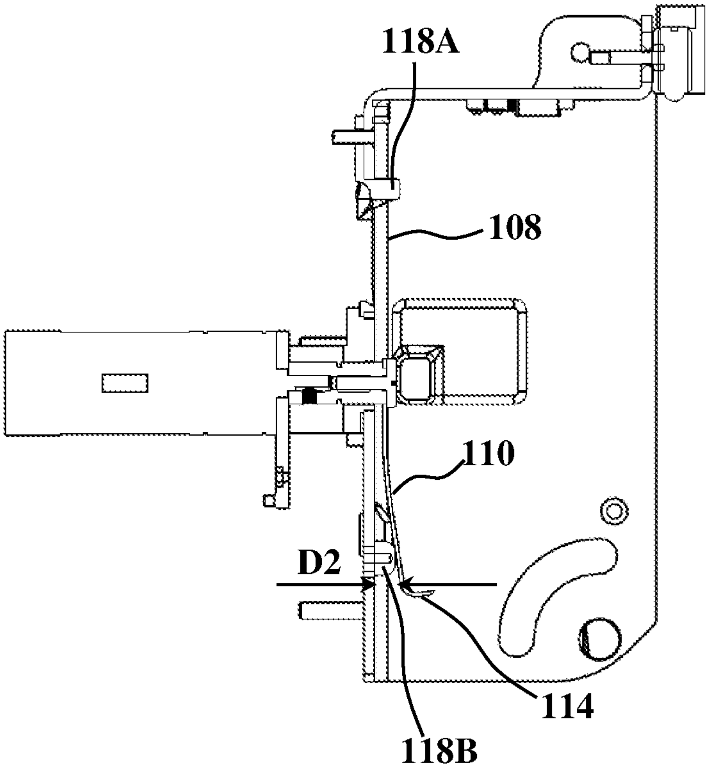
Figure 6A:
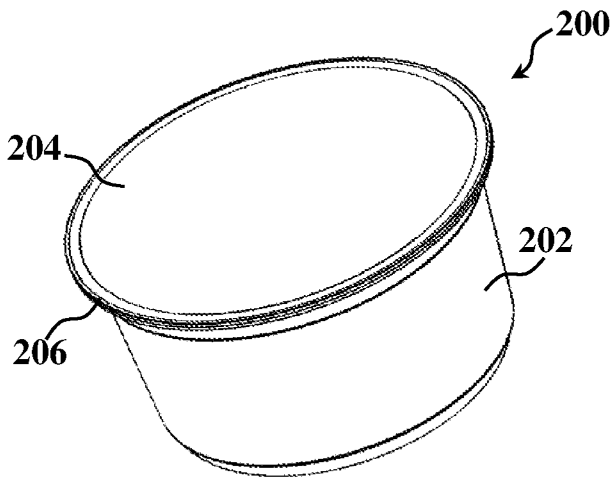
FIGS. 6A-6C show ingredients' containers, e.g. a capsule, before insertion into the module (FIG. 6A), the vent opening (FIG. 6B) and with both the vent opening and the extraction opening (FIG. 6C)
Figure 6B:
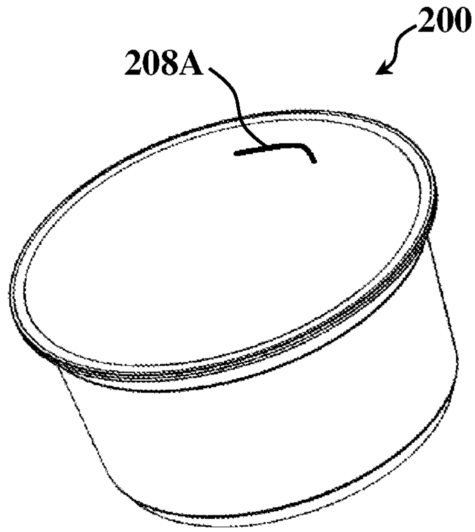
Figure 6C:
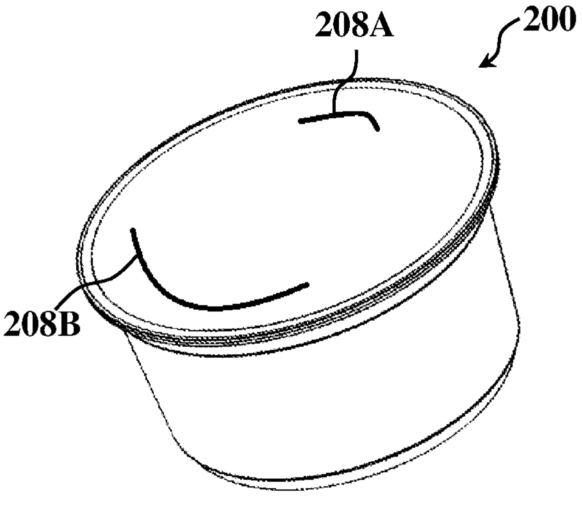

Formed on wall section 108 are protruding wall elements 118A and 118B, having corresponding heights D1 and D2, such that both D1 and D2 are larger than d, as can be seen in the cross-sectional views in FIGS. 5A-5C. Protruding wall elements 118A and 118B are disposed along the rotation path 116, and are configured to cause the distal end of the rotatable element 110 to displace from distance d to distance D1 or D2 when the rotatable element 110 engages protruding wall elements 118A and 118B during its movement along the rotation path 116. As container 200 is maintained in a stationary position with respect to the rotatable element 110, the movement from distance d to distance D1 or D2, proximates the cutting edge 114 to cover 204. Dimensions D1 and D2 are selected such that once the container 200 is in proper position, cutting edge 114 penetrates the cover 204 when the rotatable element 110 engages the protruding wall elements 118A and 118B and during element's 110 movement along elements 118A and 118B, thus forming openings 208A and 208B in cover 204, as seen in FIGS. 6B-6C.

As can be seen in FIGS. 4A-6C, the location and geometry of the openings 208A and 208B corresponds to the location and geometry of protruding wall elements 118A and 118B, respectively. Hence, by modifying the location, geometry or number of the protruding wall elements, various openings arrangement can be obtained.

In this specific example, opening 208B functions to permits. flow of the ingredients out of the container 200 into inlet 12 and from there to the processing chamber 12, while opening 208A functions to enable introduction of ambient air into the container to permit an even and steady flow of ingredients out of the container. By controlling the location of the protruding wall segments, control can be obtained over the relative position of the openings, permitting optimization of the flow rate of ingredients out of the container.

While in this specific example the rotation of the rotatable element 110 is in the clockwise direction, it is also possible that the rotatable element 110 be rotated in the counter-clockwise direction along rotation path 116, thereby forming first opening 208B and thereafter opening 208A.

While rotating element 110 is shown in this specific example as an arm fitted with a single cutting edge, a person of skill would realize that the number and location of cutting edges along the rotating element can be modified to obtain additional cutting geometries.

Figure 7:
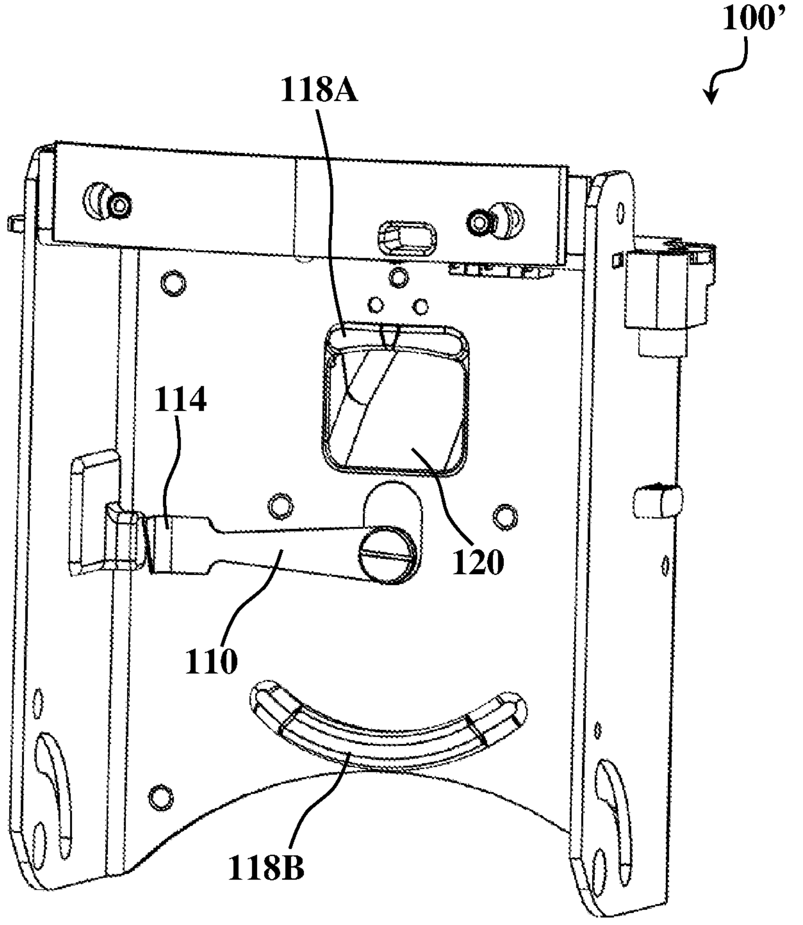
FIG. 7 shows a module for forming an opening in the capsule according to another embodiment of this disclosure.

FIG. 7 shows a variation of the module 100, namely module 100'. Module 100' comprises a top opening 120, through which additional ingredients can be introduced into the capsule and/or into the processing chamber, for example a carrier liquid (water, milk, juice, etc.). In such an arrangement, opening 208A can also serve to introduce such a carrier liquid into the capsule 200, to form an initial mixture with the contents of the capsule, such initial mixture then flowing out of the capsule, through opening 208B, into processing chamber 12.

The invention claimed is:

1. An appliance for preparation of edible product from edible ingredients, the appliance comprising:

receiving module, configured to removably receive an ingredients' container having a container body and a sealing film cover, and further configured to form two or more openings in said sealing film cover;

a processing chamber in liquid communication with the receiving module, the processing chamber being configured for receiving said edible ingredients from said ingredients' container received in said receiving module through at least one of said two or more openings, and process the edible ingredients into said edible product; and a dispensing nozzle in liquid communication with the processing chamber and configured to dispense the edible product;

receiving module comprising:

a cavity dimensioned to removably receive said ingredients' container;

a rotatable element having at least one cutting edge, the rotating element being fixed about a rotation axis to a wall section of said cavity at a first distance from said wall section, and configured to rotate parallel to said wall section, the cavity being configured to stationarily receive the ingredients' container, such that said sealing film cover is positioned to face said rotatable element; and said wall section being configured with two or more protruding wall segments, spaced apart along a rotation path of the rotatable element and configured to be engaged by the rotatable element and displace the rotatable element during its rotation thereof along the rotation path to a second distance from said wall section when the rotatable element is in contact with said protruding wall segments, the second distance being larger than the first distance, to cause the at least one cutting edge to protrude through said sealing film cover when the rotatable element is in said second distance, thereby forming said two or more openings in the sealing film cover.

2. The appliance of claim 1, wherein the rotatable element is biased to maintain said first distance when the rotatable element does not engage the protruding wall segments.

3. The appliance of claim 2, wherein said rotatable element is flexible and is biased by the flexibility thereof to said first distance.

4. The appliance of claim 2, wherein the rotatable element is associated with a biasing element, biasing the rotatable element into said first distance.

5. The appliance of claim 1, wherein said rotatable element comprises two or more cutting edges.

6. The appliance of claim 1, wherein said rotatable element is made of an elastic metal or metal alloy.

7. The appliance of claim 1, wherein said receiving module comprises a container seat, configured to receive at least a bottom portion of said container body.

8. The appliance of claim 7, wherein said container seat being displaceable to permit positioning of the ingredients' container within the cavity such that said sealing film cover is positioned to face said rotatable element.

9. The appliance of claim 1, wherein said processing chamber is a cooled processing chamber, and comprising one or more rotatable mixing pedals.

10. The appliance of claim 1, being an appliance for preparation of a cooled edible product from said edible ingredients.

11. The appliance of claim 1, wherein said cavity is dimensioned to receive the ingredients' container, said ingredients' container holding said edible ingredients for the preparation of a single serving of said edible product from entire content of said ingredients' container.

12. The appliance of claim 11, wherein said cavity is configured to receive said ingredients' container, the ingredients' container being in a form selected from a single serving pod and a single serving capsule.

13. A receiving module for an appliance for preparation of edible product from edible ingredients, the receiving module comprising:

a cavity dimensioned to removably receive an ingredients' container having a container body and a sealing film cover;

a rotatable element having at least one cutting edge, the rotatable element being fixed about a rotation axis to a wall section of said cavity at a first distance from said wall section, and configured to rotate parallel to said wall section, the cavity being configured to stationarily receive the ingredients' container, such that said sealing film cover is positioned to face said rotatable element; and said wall section being configured with two or more protruding wall segments, spaced apart along a rotation path of the rotatable element and configured to be engaged by the rotatable element and displace the rotatable element during its-rotation thereof along the rotation path to a second distance from said wall section when the rotatable element is in contact with said protruding wall segments, the second distance being larger than the first distance, to cause the at least one cutting edge to protrude through said sealing film cover when the rotatable element is in said second distance, thereby forming two or more openings in the sealing film cover;

the receiving module being configured to form liquid communication with a processing chamber of said appliance to permit the edible ingredients from the ingredients' container to be received in said processing chamber through at least one of said two or more openings.

* * * * *